United States Patent
Tokunaga (10) Patent No.: US 6,674,200 B2
(45) Date of Patent: Jan. 6, 2004

(54) SPINDLE MOTOR

(75) Inventor: Shinya Tokunaga, Koga-Gun (JP)

(73) Assignee: NIDEC Corporation, Kyoto (JP)

( * ) Notice: Subject to any disclaimer, the term of this patent is extended or adjusted under 35 U.S.C. 154(b) by 52 days.

(21) Appl. No.: 10/064,230

(22) Filed: Jun. 22, 2002

(65) Prior Publication Data

US 2002/0195894 A1 Dec. 26, 2002

(30) Foreign Application Priority Data

Jun. 22, 2001 (JP) ........................................ 2001-190430

(51) Int. Cl.[7] .............................. H02K 5/16; F16C 32/06
(52) U.S. Cl. ........................ 310/90; 384/397; 384/371; 384/322
(58) Field of Search ............................................ 310/90

(56) References Cited

U.S. PATENT DOCUMENTS

| | | | | |
|---|---|---|---|---|
| 3,591,817 A | * | 7/1971 | Kunzle | 310/50 |
| 5,246,294 A | * | 9/1993 | Pan | 384/119 |
| 5,254,893 A | * | 10/1993 | Ide | 310/90 |
| 5,658,080 A | * | 8/1997 | Ichiyama | 384/112 |
| 5,689,146 A | * | 11/1997 | Cheever | 310/90 |
| 5,697,708 A | * | 12/1997 | Leuthold et al. | 384/110 |
| 5,722,775 A | * | 3/1998 | Thijsse et al. | 384/119 |
| 5,822,846 A | * | 10/1998 | Moritan et al. | 29/598 |
| 5,984,627 A | * | 11/1999 | Ramsay | 415/112 |
| 6,019,516 A | * | 2/2000 | Leuthold et al. | 384/110 |
| 6,127,756 A | * | 10/2000 | Iwaki et al. | 310/90 |
| 6,252,322 B1 | * | 6/2001 | Kawawada et al. | 310/90 |
| 6,322,252 B1 | * | 11/2001 | Grantz et al. | 384/124 |
| 6,552,456 B2 | * | 4/2003 | Goto | 310/90 |
| 2002/0067089 A1 | | 6/2002 | Ichiyama | |

FOREIGN PATENT DOCUMENTS

| | | | | |
|---|---|---|---|---|
| JP | 6-315242 A | | 11/1994 | |
| JP | 06315242 A | * | 11/1994 | ............ H02K/7/08 |
| JP | 7-7886 A | | 1/1995 | |
| JP | 07007886 A | * | 1/1995 | ............ H02K/7/08 |
| JP | 11082509 A | * | 3/1999 | ............ F16C/32/00 |
| JP | 2001139971 A | * | 5/2001 | ........ C10M/105/74 |

OTHER PUBLICATIONS

US Patent Application Publication, Ichiyama, Motor Having Single Cone Fluid Dynamic Bearing Balanced with Magnetic Attraction, Jun. 6, 2002.*

* cited by examiner

Primary Examiner—Nestor Ramirez
Assistant Examiner—J. Aguirrechea
(74) Attorney, Agent, or Firm—James Judge (57) ABSTRACT

Spindle motor that has high rotational precision and is manufacturable at low cost, and that can be applied even in miniature, low-profile recording-disk drives. The spindle motor includes a shaft having a cone portion, a conic-shaped cavity into which the cone portion is inserted, and only a single dynamic-pressure bearing, formed on the lateral face of the cone portion. The working fluid is oil, and the oil fills without interruption a clearance between the shaft's cone portion and the conical cavity.

12 Claims, 4 Drawing Sheets

SPINDLE MOTOR

BACKGROUND OF INVENTION

1. Technical Field

The present invention relates to spindle motors utilizing dynamic pressure bearings, and in particular to low-profile, small-diameter spindle motors for spin-driving recording disks of small outside diameter, such as 1-inch.

2. Description of Related Art

Owing to advances in telecommunications technology and to increases in data volume, attempts to load hard-disk and other recording-disk drives, which had been utilized in conventional personal computers, into ultra-miniature information devices such as portable information terminals have begun.

Because the emphasis in these information devices is on compactness and lightness of weight, the dimension in the height direction that is allowed their recording-disk drives is being restricted to approximately 2 mm. Likewise, there has been a trend toward making the recording disks themselves diametrically smaller, and in recent years ultra-small-diameter hard disks one inch across have been put into practical use. Consequently, calls for miniaturizing and slimming-down, as well as for improving the rotational precision of, the drives that drive these recording-disks are increasingly on the rise.

Furthermore, the trend toward lower-priced information devices utilizing these recording-disk drives has been pronounced, which has raised demands for reduced costs in the spindle motors for recording-disk drives all the more.

Responding to such demands as noted above has led, as for example with the spindle motor disclosed in Japanese Pat. App. Pub. No. 2001-139971, to the utilization of dynamic-pressure bearings, which provide bearing support by inducing dynamic pressure in a fluid such as oil, instead of the ball bearings that up till now had principally been used for supporting rotation of the rotor onto which the recording disks are fitted. In the Japanese Pat. App. Pub. No. 2001-139971 instance, herringbone-patterned, dynamic-pressure-generating grooves formed on the circumferential periphery of a flange-shaped plate provided on the shaft constitute a radial bearing section of the dynamic-pressure bearings set out in the conventional spindle motor disclosed.

Meanwhile, herringbone-patterned, dynamic-pressure-generating grooves formed on both the upper and lower faces of the plate constitute a pair of thrust bearings therein.

Dynamic-pressure bearings of this sort make non-contacting support of the rotor possible, by virtue of which high rotational precision with low vibration and noise is readily gained. Furthermore, in contrast to ball bearings, with which if high bearing rigidity is to be gained there is no choice but to employ large-diameter balls, with dynamic-pressure bearings, the more minute the gap in which fluid is retained, the higher their rigidity tends to be. This is a characteristic that is ideal for miniaturizing and slimming-down spindle motors.

Nevertheless, because only an extremely thin layer of fluid is present on the bearing surfaces of the minute gaps in dynamic-pressure bearings, they demand high precision in the dimensions and surface smoothness of the bearing-constituent components. This is because lack of precision in the components would lead to bearing surface contact, impairing the rotational precision. For this reason keeping fabrication costs down would be difficult, and responding to demands for reduced costs would not be an easy matter, if numerous dynamic-pressure-generating areas are, as with the conventional spindle motor noted earlier, to be formed. Likewise, the difficulty in securing regions such as the circumferential surface of the shaft to function as bearings (regions that contribute to generation of dynamic pressure) if the spindle motor is to be miniaturized and made low-profile leads to concern over the bearing rigidity being impaired.

Thus, improvement in rotational precision, together with reduction in manufacturing cost, of a spindle motor applicable even to miniature, low-profile recording-disk drives has been desired.

Further, because portable information terminals operate on batteries, lessening power consumption of recording-disk drives that are utilized by such devices is a must.

SUMMARY OF INVENTION

An object of the present invention is to adapt a spindle motor utilizing dynamic-pressure bearings to miniature, low-profile recording-disk drives.

Another object is the realization of improvement in rotational precision, together with manufacturing cost reduction, in a spindle motor utilizing dynamic-pressure bearings.

A different object of the present invention is to effect a spindle motor of lesser electric power consumption.

To realize these objects a spindle motor under the present invention supports radial and thrust loads with a single dynamic-pressure bearing. Specifically, a conical part is furnished on the shaft, and the lateral face of the conical part is rendered a surface of a dynamic-pressure bearing. In a conically shaped hollow provided in the sleeve part of the motor the conical part is nested, which puts the lateral face of the conical part and the inner peripheral face of the conically shaped hollow in confrontation across a micro-gap, wherein oil is filled into the gap. Only a single dynamic-pressure bearing is formed along the conical lateral face.

Rendering the conical lateral face as the dynamic-pressure-bearing surface enables supporting loads with respect to both the radial and thrust directions by the one dynamic-pressure bearing. Likewise, the precision-working that dynamic-pressure surfaces require need be in one place only, which is advantageous in terms of lowering costs. Furthermore, miniaturizing and slimming-down the spindle motor are facilitated, compared to the situation in which the motor is built with both a radial bearing section and a thrust bearing section.

Further, rendering the dynamic-pressure bearing as only one reduces losses due to the oil's viscous resistance. This accordingly reduces failures during rotation and enables the amount of power that the motor consumes to be controlled.

The dynamic-pressure generating grooves are preferably rendered in an unbalanced herringbone form, or as spiral grooves that impel the oil in a predetermined direction only. By thus rendering the groove geometry, pressure directed toward the bottom of the conical cavity is applied to the oil during rotation of the motor, raising the oil pressure near the bottom of the conical cavity and raising the bearing force in the thrust direction.

Other than bearing force due to dynamic pressure and bearing force due to pressurized oil, a magnetic biasing means is employed as a bearing force along the thrust direction. The magnetic biasing means acts in a direction counter to the other two bearing forces to control over-lift and stabilize support along the thrust direction. Further, the conical form of the dynamic-pressure-bearing surface stabilizes the thrust-directed support, whereby the radial-directed bearing support is also stabilized.

The opening of the conical hole is closed over by a disk-shaped cover in the middle of which, meanwhile, a hole through which the shaft passes is opened. The reverse face of the disk-shaped cover faces the basal surface of the conical part, and the radially outward area in the region sandwiched by these two surfaces is filled with oil. Meanwhile, with the area toward the center being filled with air, a gas-liquid interface is formed along the way in the region sandwiched by the two surfaces. Due to the surface tension of the oil, the gas-liquid interface forms a meniscus whose contour dips radially outward. Because the gas-liquid interface is pressed radially outward under centrifugal force during rotation of the motor, a stabilized sealing function is produced.

From the following detailed description in conjunction with the accompanying drawings, the foregoing and other objects, features, aspects and advantages of the present invention will become readily apparent to those skilled in the art.

DETAILED DESCRIPTION

Embodiments of a spindle motor having to do with the present invention will be explained in the following with reference to each of the drawings from FIG. 1 to FIG. 4.

Figure 1:
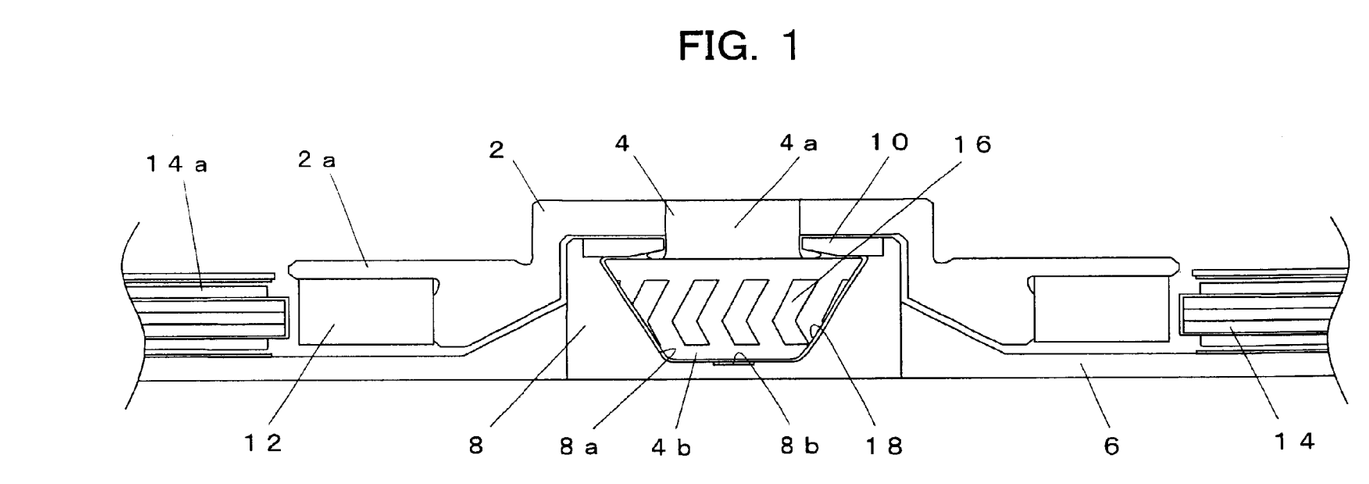
FIG. 1 is a sectional view schematically illustrating the configurational outline of a spindle motor having to do with a first embodiment of the present invention.
Figure 2:
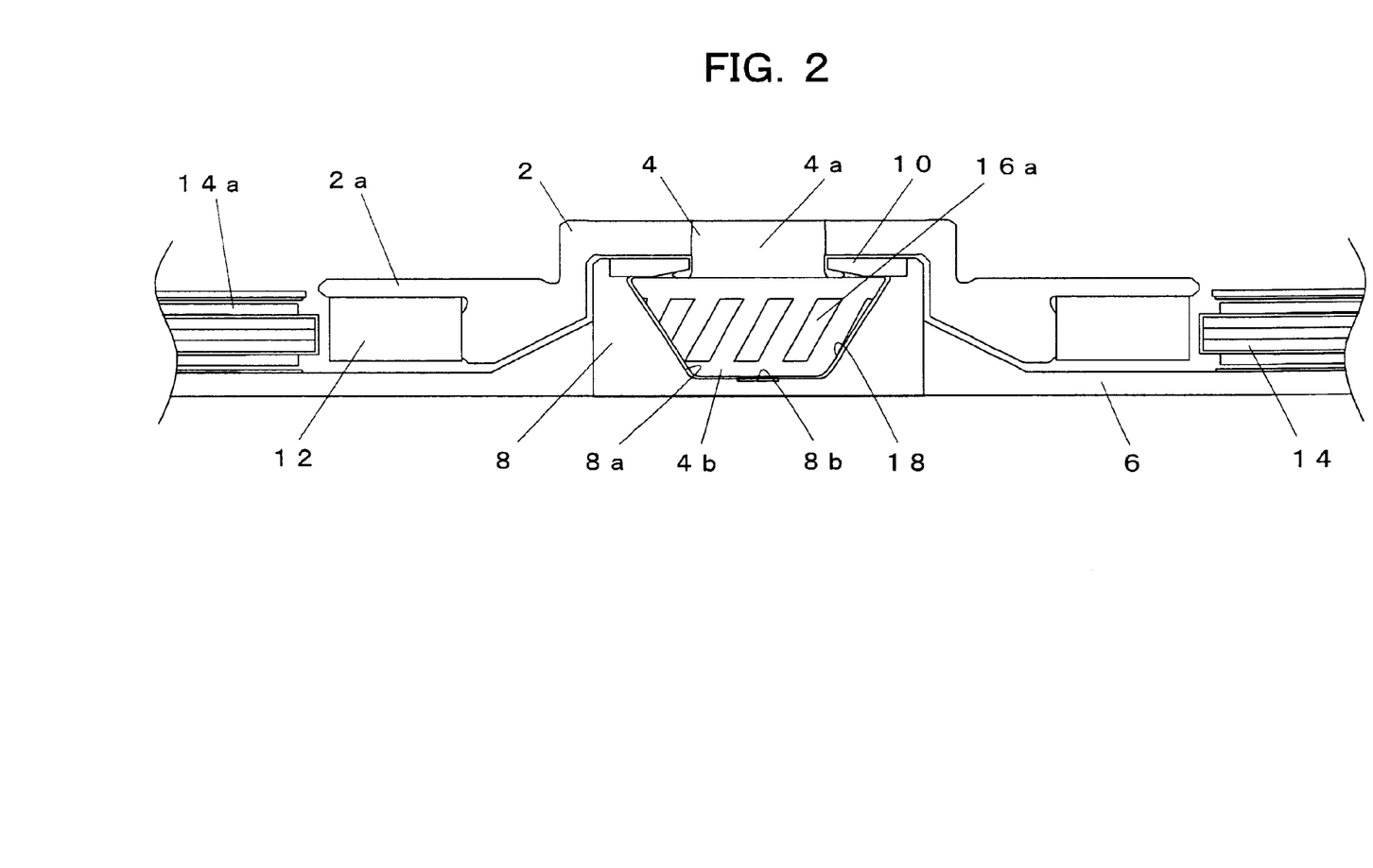
FIG. 2 is a sectional view schematically illustrating the configurational outline of a modified example of the spindle motor represented in FIG. 1 in connection with the first embodiment of the present invention.

FIGS. 1 and 2 are a first embodiment of a spindle motor, as well as a modified example thereof, in connection with the present invention. The spindle motor having to do with the first embodiment of the present invention has a so-called rotary-shaft configuration in which the rotor hub and the shaft are supported to let them rotate with respect to the sleeve. In particular, the spindle motor having to do with the first embodiment of the present invention is furnished with a rotor hub 2 that retains recording disks (not illustrated) such as hard disks on a disk-mounting portion 2a, and a shaft 4 that spins together with the rotor hub 2. The shaft 4 is provided with a round-cylindrical spindle portion 4a and, continuous with the spindle portion 4a and jutting radially outward beyond the spindle portion 4a, a conic frustum portion 4b having a conical frustum shape. The conic frustum portion 4b is inserted within a conic-frustum-shaped cavity 8a corresponding to the superficial contour of the conic frustum portion 4b and provided in a round-cylindrical sleeve 8 installed in a bracket 6. The upper-end portion of the conic-frustum-shaped cavity 8a toward the rotor hub 2 is open. The open end of the cavity 8a is closed over by a disk-shaped cap member 10 in the approximate middle of which is formed a round opening through which the spindle portion 4a is passed. Here, the cap member 10 is formed by a press-working process.

An annular rotor magnet 12 is fitted to the lower part of the disk-mounting potion 2a of the rotor hub 2. Further, a stator 14 from which a plurality of iron cores stick out is installed in the bracket 6, wherein the stator 14 encompasses the outer circumferential side of the rotor magnet 12. In response to electricity passing into coils 14a wound onto the stator 14, an electric field is generated in between the rotor magnet 12 and the stator 14, whereby the rotor hub 2 is driven.

A gap is formed in between the conic frustum portion 4b and the frustum-shaped cavity 8a, and oil is retained continuously within the gap without interruption. The circumferentially peripheral face of the frustum portion 4b heading from its upper to its lower face is an inclined surface that diametrically contracts into a taper, and on the inclined surface herringbone grooves 16 are formed. The herringbone grooves 16 are formed oriented circumferentially on the frustum portion 4b and, with their midportion displaced off-center toward the lower end of the frustum portion 4b, are axially unbalanced in configuration.

The herringbone grooves 16 are formed oriented circumferentially on the frustum portion 4b and, with their midportion displaced off-center toward the lower end of the frustum portion 4b, are axially unbalanced in configuration.

When the shaft 4 spins together with the rotor hub 2, the herringbone grooves 16 induce dynamic pressure in the oil retained in the gap between the circumferentially peripheral face of the frustum portion 4b and the confronting inner peripheral face of the frustum-shaped cavity 8a. In addition, the fact that the dynamic-pressure generating grooves have a displaced midportion heightens the pressure of the oil as it heads toward the bottom face of the cavity 8a. These components and factors constitute a dynamic-pressure bearing area 18.

By configuring the dynamic-pressure bearing area 18 in this way between a pair of confronting inclined surfaces, dynamic pressure generated in the oil supports radially directed loads, and at the same time supports those loads directed axially downward among loads in the axial direction. Likewise, the pressure heightened by the displacement in the midportion of the dynamic-pressure generating grooves in the oil heading toward the bottom face of the frustum-shaped cavity 8a supports those loads directed toward the axially lower side among loads in the axial direction. That is, the dynamic-pressure bearing area 18 makes it possible to take on singly both the functions of the radial bearing section and the thrust bearing section in conventional dynamic-pressure bearings. Here, in the illustrated embodiment an example is shown in which the shape of the conic frustum portion 4b is such that it tapers heading toward the bottom end of the frustum-shaped cavity 8a, but the shape can be the converse of this—rendered such that the outer diameter increases gradually heading toward the bottom end of the cavity 8a.

Further, instead of the unbalanced herringbone grooves 16, the dynamic-pressure generating grooves can be rendered as spiral grooves 16a that act to force the oil into the bottom end of the frustum-shaped cavity 8a. This embodying example is illustrated in FIG. 2. Forcing the oil into the bottom end of the cavity 8a in this way yields bearing power in the radial direction; at the same time it enlarges the oil internal pressure along the fore end of the frustum portion 4b, therefore making it possible to generate sufficient axially directed bearing power that acts in the direction lifting the bearing. Here, for forming the dynamic-pressure-generating grooves in the dynamic-pressure bearing area 18, utilizing an electrochemical process is desirable in terms of the extent of the degrees of freedom in the form the manufacturing step takes.

Another consideration is that the rotor hub 2 as well as the shaft 4 are affected by load acting axially downward (toward the bracket 6) originating from the weight of the rotary portions themselves, and load acting axially upward (liftward) originating in the spinning of the recording disks, and these axially directed loads acting in either direction must be supported by the bearing section. As noted above, load acting axially downward is supported by force acting in the lifting direction generated in the dynamic-pressure bearing area 18. Likewise, load acting axially upward is supported by displacing the magnetic center of the rotor magnet 12 somewhat axially upward with respect to the magnetic center of the stator 14. That is, the rotor hub 2 is magnetically biased by magnetic attraction in between the rotor magnet 12 and the stator 14 that acts axially downward. The force of attraction toward the axially lower end due to the magnetic bias, and the axially upward-acting lifting force generated in the dynamic-pressure bearing area 18 balance, whereby the rotor hub 2 as well as the shaft 4 are supported at a constant height.

In this way, the dynamic pressure generated in the single dynamic-pressure bearing area 18 alone, configured between the frustum portion 4b and the frustum-shaped cavity 8a, and the magnetic bias on the rotor hub 2, stemming from the magnetically attractive force acting in between the rotor magnet 12 and the stator 14, enable support of the rotation of the rotor hub 2 along with the shaft 4. Therefore, the number of dynamic-pressure bearing sections—which, given the high-precision manufacturing that they demand, has been a factor blocking the way to bettering production efficiency and lowering costs—is curtailed.

Moreover, compared to the situation in which the dynamic-pressure bearing area is configured between the outer circumferential surface of a round-cylindrical shaft and the inner circumferential surface of a round-cylindrical sleeve, this configuration allows, in the same axial dimension, the dynamic-pressure bearing area to assume a larger breadth.

Further, the oil retained continuously without interruption in the gap formed between the frustum portion 4b and the frustum-shaped cavity 8a creates, within the axial gap formed between the undersurface of the cap member 10 and the upper surface of the frustum portion 4b, a gas-liquid interface with the air. The gas-liquid interface extends approximately axially and partitions the gap radially. The fact that the gas-liquid interface is thus created in a situation in which the oil-filled location occupies the radially outward side means that the gas-liquid interface is pressed radially outward, i.e., toward the dynamic-pressure bearing area 18, under the action of centrifugal force during rotation. This strengthens the sealing function, whereby scattering of the oil to the bearing exterior may be prevented as much as possible.

Herein, as illustrated, forming the undersurface of the cap member 10 to be sloped such that the gap it forms with the upper surface of the frustum portion 4b expands heading radially inward further heightens the sealing function. Wherein as illustrated the gas-liquid interface is formed in the tapering gap, because radially center-ward movement of the interface enlarges the interface surface area, such movement will not occur as long as at least the power that just overcomes the surface tension is not exerted. In other words, the sealing power will be heightened by the amount the surface tension is. Likewise, because the sloped undersurface of the cap member 10 increases the gap volume, the gap may be configured to have a shorter radial dimension while still enabling it to deal with oil increase/decrease originating in thermal expansion.

A round recess 8b is formed in the approximate middle of the bottom of the frustum-shaped cavity 8a, somewhat enlarging the gap between it and the frustum portion 4b. When oil is urged toward the bottom end of the cavity 8a by the pumping action of the herringbone grooves 16 during rotation of the shaft 4 together with the rotor hub 2, dust and like foreign matter from frustum-portion 4b or cavity 8a surface wear that is mixed into the oil is washed together with the oil toward the bottom end of the cavity 8a. This foreign matter eventually concentrates around the center area of the cavity 8a. If the foreign matter clumps and grows as large as the axial dimension of the gap in between the frustum portion 4b and the bottom portion of the cavity 8a, it will bite into either component and give rise to burnout. Accordingly, forming the round recess 8b in the location where the foreign matter concentrates keeps the gap from being enlarged and prevents scratching by the foreign matter. At the same time, because the foreign matter is captured within the recess 8b, preventing the foreign matter from once more dispersing into the oil while the motor is stopped, the foreign matter may be kept from inviting further wear that would deteriorate the bearing function.

Next, a second embodiment of a spindle motor, as well as a modified instance thereof, having to do with the present invention will be explained with reference to FIGS. 3 and 4. Now in FIGS. 3 and 4, portions whose makeup is the same as in the spindle motor of the foregoing first embodiment are labeled with identical reference numerals, and explanation thereof is omitted.

Figure 3:
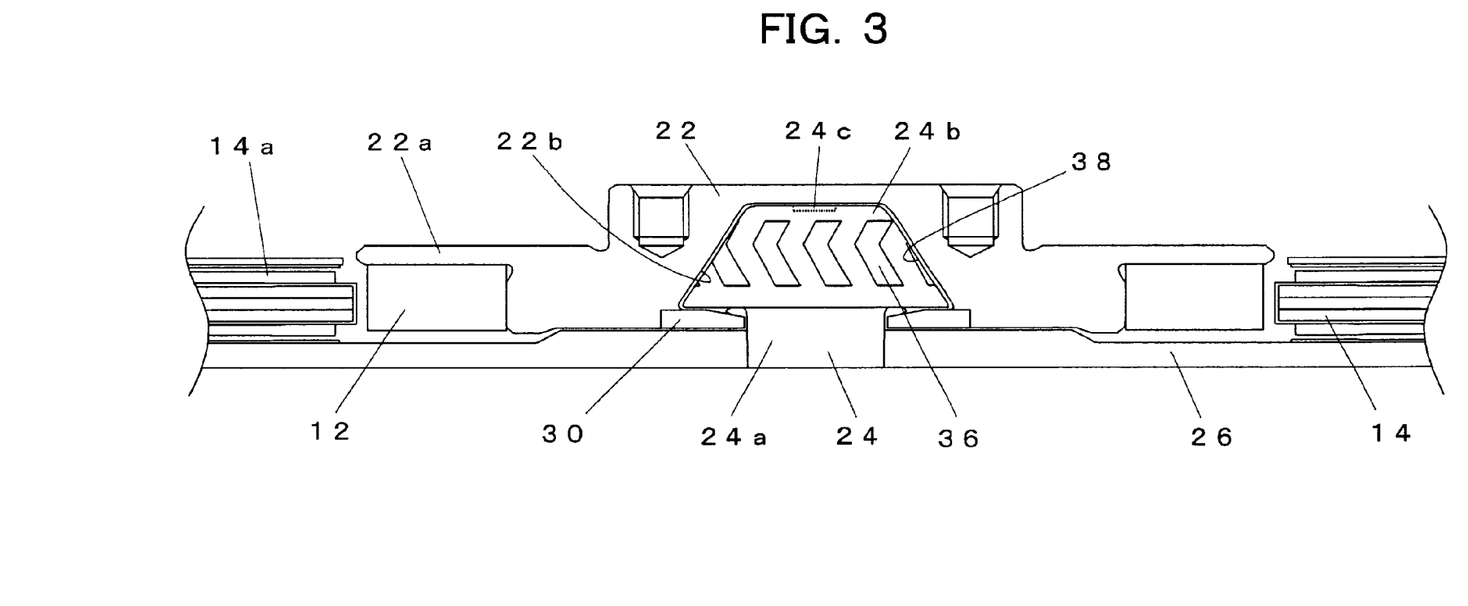
FIG. 3 is a sectional view schematically illustrating the configurational outline of a spindle motor having to do with a second embodiment of the present invention.
Figure 4:
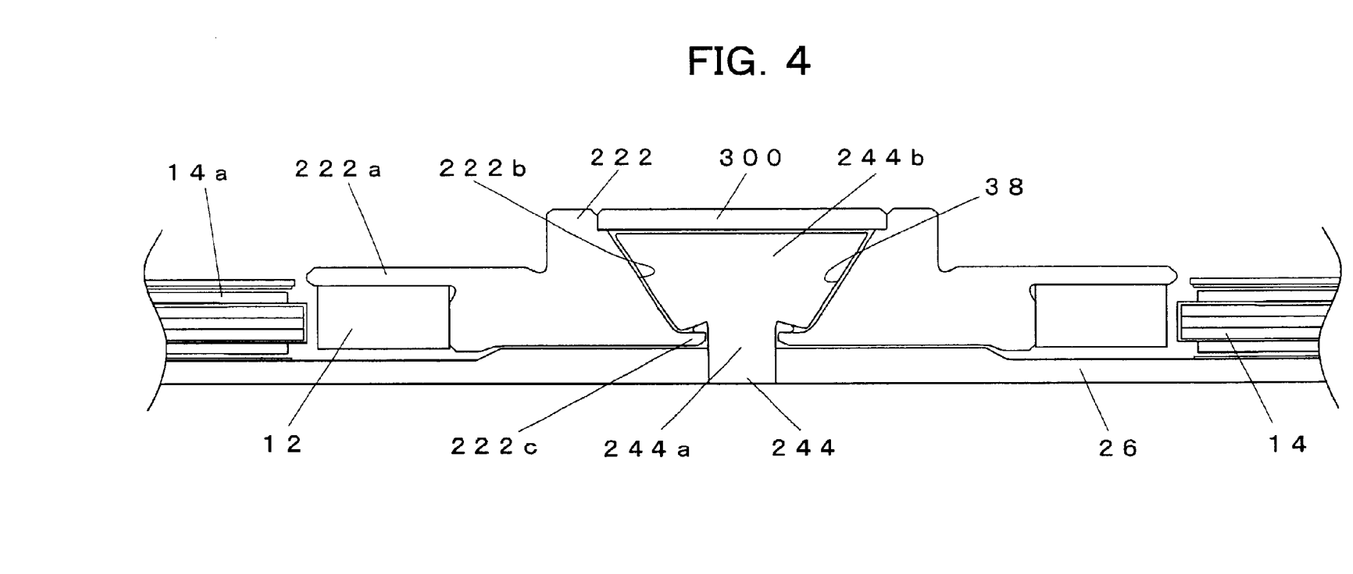
FIG. 4 is a sectional view schematically illustrating the configurational outline of a modified example of the spindle motor represented in FIG. 3 in connection with the second embodiment of the present invention.

Set out in FIG. 3, a spindle motor in connection with the second embodiment of the present invention has a so-called shaft-stationary configuration, wherein the rotor hub is supported to let it rotate with respect to a shaft that is fixed. In particular, the spindle motor having to do with the second embodiment is furnished with: a shaft 24; a round-columnar spindle portion 24a fixedly fitted into a mounting hole provided in a bracket 26; and, continuous with the spindle portion 24a and jutting radially outward beyond the spindle portion 24a, a conic frustum portion 24b. The conic frustum portion 24b is inserted within a conic-frustum-shaped cavity 22b corresponding to the superficial contour of the conic frustum portion 24b and provided in a rotor hub 22. The lower-end portion of the conic-frustum-shaped cavity 22b toward the bracket 26 is open, and the open end of the cavity 22b is closed over by a disk-shaped cap member 30 in the approximate middle of which is formed a round opening through which the spindle portion 24a is passed. Further, the rotor hub 22, which is free to rotate relative to the shaft 24, is furnished with a disk-mounting portion 22a onto which recording disks fit. Here, a round recess 24c is formed, as indicated by the dotted lines in FIG. 3, in the approximate middle of the upper face of the frustum portion 24b, somewhat enlarging the gap between it and the frustum-shaped cavity 22b.

A gap is formed in between the frustum portion 24b and the cavity 22b, and oil is retained continuously within the gap without interruption. The circumferentially peripheral face of the frustum portion 24b heading from its lower to its upper face is an inclined surface that diametrically contracts into a taper, and on this surface herringbone grooves 36 are formed. When the rotor hub 22 spins, the herringbone grooves 36 induce dynamic pressure between where they are and the inner peripheral face of the frustum-shaped cavity 22b, which is the surface that confronts the circumferentially peripheral face of the frustum portion 24b. In addition, by means of their displaced midportion, the dynamic-pressure generating grooves heighten the pressure of the oil as it heads toward the surface in the upper end of the frustum-shaped cavity 22b, which is its closed-side end.

By configuring a dynamic-pressure bearing area 38 between a pair of confronting inclined surfaces, dynamic pressure generated in the oil supports radially directed loads, and at the same time supports those loads directed axially downward among loads in the axial direction. Likewise, the pressure heightened by the displacement in the midportion of the dynamic-pressure grooves in the oil heading toward the closed-side end of the frustum-shaped cavity 22b supports those loads directed toward the axially upper side among loads in the axial direction. That is, the dynamic-pressure bearing area 38 makes it possible to take on singly both the functions of the radial bearing section and the thrust bearing section in conventional dynamic-pressure bearings. Again, the rotor hub 22 is magnetically biased through magnetic attraction in between the rotor magnet 12 and the stator 14 that acts axially downward. The force of attraction toward the axially lower end due to the magnetic bias, and the axially upward-acting lifting force generated in the dynamic-pressure bearing area 38 balance, whereby the rotor hub 22 is supported at a constant height.

Here, in the second embodiment represented in FIG. 3 an example is shown in which the shape of the conic frustum portion 24b is such that it tapers heading toward the upper end of the frustum-shaped cavity 22b, but the shape can be the converse of this. For example, as shown in FIG. 4, a conic frustum portion 244b provided on and continuous with a spindle portion 244a of a shaft 244 assumes a contour whose outer diameter increases gradually heading toward the upper-end side of a conic-frustum-shaped cavity 222b in a rotor hub 222. In this case, for ease of assembly, the configuration desirably is rendered by forming the rotor hub 222 such that both ends of the cavity 222b are open, and after inserting the shaft 244, covering the cavity 222b over with a disk-shaped cap member. A round aperture delimited by a radially inward-protruding portion 222c, for insertion of the spindle portion 244a, is opened in the bracket-ward end of the cavity 222b. Oil retained continuously in between the frustum portion 244b and the cavity 222b forms a gas-liquid interface with the air, in between the upper surface of the radially inward-protruding portion 222c and the undersurface of the frustum portion 244b.

A spindle motor configured in this manner in connection with the second embodiment of the present invention, as well as the modified instance thereof, enables like actions and effects as with the spindle motor having to do with the aforementioned first embodiment of the present invention to be demonstrated.

While the foregoing has described embodiments of a spindle motor having to do with the present invention, the present invention is not limited to these embodiments, and various changes and modifications are possible without departing from the scope of the invention.

For example, in the above-described embodiments, explanation was made taking as an example a configuration that magnetically biases the rotor hub 2/22 by displacing the magnetic centers of the rotor magnet 12 and the stator 14. Instead of that, however, it is possible to render the configuration leaving the magnetic centers of the rotor magnet 12 and the stator 14 coincident, and magnetically biasing the rotor hub 2 by arranging a magnetic material in a location on the bracket 6 that corresponds to the undersurface of the rotor magnet 12, to generate magnetically attractive force acting in the axial direction.

Likewise, the herringbone grooves 16/36 that are the dynamic-pressure-generating striations in the dynamic-pressure bearing area 18/38 may be formed on at least one or the other of the circumferentially peripheral face of the frustum 4b/24b/244b and the inner peripheral face of the frustum-shaped cavity 8a/22b/222b; whether to form them on either face or to form them on both faces can be a choice of convenience according to the ease with which the components are manufactured, the burden load supported, etc.

I claim:
1. A spindle motor comprising:
a shaft;
a round cone portion being a part of said shaft, and whose diameter changes evenly along said shaft longitudinally;
an approximately disk-shaped hub mounted on one end of, for rotating together with, said shaft said hub having a disk-mounting portion on one side thereof:
a rotor magnet mounted on the peripherally outer margin of said hub opposite the disk-mounting side;
a stator installed opposing a radial edge face of said rotor magnet;
a conical cavity whose opening changes in diameter evenly along said shaft longitudinally, to correspond in contour to said cone portion, for accommodating said cone portion, said conical cavity having a base corresponding to the narrower end of said cone portion and an inner peripheral surface opposing a lateral surface of said cone portion across an approximately uniform gap;
a member including said conical cavity;
oil filling a clearance, including the approximately uniform gap, between said cone portion and said conical cavity, wherein said oil is retained continuously without interruption; and one and only one dynamic-pressure bearing formed in said gap, between the lateral surface of said cone portion and the inner peripheral surface of said conical cavity opposing the lateral surface, said dynamic-pressure bearing including, on at least either said lateral surface of said cone portion or said inner peripheral surface of said conical cavity, grooves provided in one and only one set unbroken axially and in unbalanced herringbone or spiral form, configured so as to heighten pressure heading toward the base of said conical cavity.
2. The spindle motor set forth in claim 1, further including a magnetic biasing mean acting in a direction counter to thrust-directed bearing force generated by action of said dynamic-pressure bearing, and cooperating with said dynamic-pressure bearing to support said shaft and said member rotating one relative to the other.
3. The spindle motor set forth in claim 2, wherein:
said conical cavity at its mouth is closed over by a disk-shaped cover having an aperture through which said shaft is inserted; and
a gas-liquid interface on said oil is positioned in between an upper face of said cone portion and an undersurface of said disk-shaped cover.
4. The spindle motor set forth in claim 1, wherein a recess for capturing foreign matter mixed into said oil is formed in the approximate mid-area of the bottom portion of said conical cavity.

5. A spindle motor comprising:

a shaft;

a round cone portion being a part of said shaft, and whose diameter changes evenly along said shaft longitudinally:

an approximately disk-shaped hub mounted on one end of, for rotating together with, said shaft, said hub having a disk-mounting portion on one side thereof;

a rotor magnet mounted on the peripherally outer margin of said hub opposite the disk-mounting side;

a stator installed opposing a radial edge face of said rotor magnet;

a conical cavity whose opening changes in diameter evenly along said shaft longitudinally, to correspond in contour to said cone portion, for accommodating said cone portion, said conical cavity having a base corresponding to the wider end of said cone portion and;

a member including said conical cavity;

a clearance between said cone portion and said conical cavity;

oil filling said clearance continuously; and one and only one dynamic-pressure bearing formed in said clearance between a lateral surface of said cone portion and an inner peripheral surface of said conical cavity opposing the lateral surface, said dynamic-pressure bearing including, on at least either said lateral surface of said cone portion or said inner peripheral surface of said conical cavity, grooves provided in one and only one set unbroken axially and in unbalanced herringbone or spiral form, configured so as to heighten pressure heading toward the base of said conical cavity; wherein said cone portion diametrically expands heading toward the base of said conical cavity.

6. A spindle motor comprising:

a shaft fixedly fitted into a bracket;

a round cone portion being a part of said shaft, and whose diameter changes evenly along said shaft longitudinally;

an approximately disk-shaped hub disposed concentrically about said round cone portion, said hub radially outwardly having a disk-mounting portion on one side thereof and centrally having a flat-based conical cavity whose opening changes in diameter evenly along said shaft longitudinally, to correspond in contour to and accommodate said cone portion at an approximately uniform gap between said conical cavity along its inner peripheral surface opposing said cone portion along its lateral surface;

a rotor magnet mounted on the other side of said hub;

a stator installed opposing a radial edge face of said rotor magnet;

oil filling a clearance, including the approximately uniform gap, between said cone portion and said conical cavity, wherein said oil is retained continuously without interruption; and one and only one dynamic-pressure bearing formed in said gap, between the lateral surface of said cone portion and the inner peripheral surface of said conical cavity opposing the lateral surface, said dynamic-pressure bearing including, on at least either said lateral surface of said cone portion or said inner peripheral surface of said conical cavity, grooves in unbalanced herringbone or spiral form, configured so as to heighten pressure heading toward the base of said conical cavity; wherein said cone portion either diametrically expands or diametrically contracts heading toward the base of said conical cavity.

7. The spindle motor set forth in claim 6, further including a magnetic biasing means acting in a direction counter to thrust-directed bearing force generated by action of said dynamic-pressure bearing, and cooperating with said dynamic-pressure bearing to support said shaft and said member rotating one relative to the other.

8. The spindle motor set forth in claim 7, wherein:

said conical cavity at its mouth is closed over by a disk-shaped cover having an aperture through which said shaft is inserted; and a gas-liquid interface on said oil is positioned in between an upper face of said cone portion and an undersurface of said disk-shaped cover.

9. The spindle motor set forth in claim 6, wherein a recess for capturing foreign matter mixed into said oil is formed in the approximate mid-area of the bottom portion of said conical cavity.

10. A spindle motor comprising:

a shaft;

a conic frustum portion being a part of said shaft, and whose diameter changes evenly along said shaft longitudinally, said conic frustum portion defining a frustum height;

an approximately disk-shaped hub mounted on one end of, for rotating together with, said shaft, said hub having a disk-mounting portion on one side thereof;

an annular rotor magnet mounted on the other side of said hub;

a stator installed opposing a radial edge face of said rotor magnet;

a sleeve member containing a conical cavity whose opening changes in diameter evenly along said shaft longitudinally, to correspond in contour to said conic frustum portion, for accommodating said conic frustum portion in its entirety, said conical cavity having a base corresponding to the narrower end of said conic frustum portion and an inner peripheral surface opposing a lateral surface of said conic frustum portion across an approximately uniform gap;

oil filling a clearance, including the approximately uniform gap, between said conic frustum portion and said conical cavity, wherein said oil is retained continuously without interruption; and one and only one dynamic-pressure bearing formed in said gap, between the lateral surface of said conic frustum portion and the inner peripheral surface of said conical cavity opposing the lateral surface, said dynamic-pressure bearing including, on at least either said lateral surface of said conic frustum portion or said inner peripheral surface of said conical cavity, grooves in unbalanced herringbone or spiral form, configured so as to heighten pressure heading toward the base of said conical cavity; wherein said conic frustum portion is configured such that said frustum height is less than one-half the radius of said annular rotor magnet.

11. A spindle motor comprising:

a shaft;

a conic frustum portion being a part of said shaft, and whose diameter changes evenly along said shaft longitudinally, said conic frustum portion defining a frustum height;

an approximately disk-shaped hub mounted on one end of, for rotating together with, said shaft, said hub having a disk-mounting portion on one side thereof;

an annular rotor magnet mounted on the other side of said hub;

a stator installed opposing a radial edge face of said rotor magnet;

a sleeve member containing a conical cavity whose opening changes in diameter evenly along said shaft longitudinally, to correspond in contour to said conic frustum portion, for accommodating said conic frustum portion in its entirety, said conical cavity having a base corresponding to the wider end of said conic frustum portion and;

a clearance between said conic frustum portion and said conical cavity;

oil filling said clearance continuously; and one and only one dynamic-pressure bearing formed in said clearance, between a lateral surface of said conic frustum portion and an inner peripheral surface of said conical cavity opposing the lateral surface, said dynamic-pressure bearing including, on at least either said lateral surface of said conic frustum portion or said inner peripheral surface of said conical cavity, grooves in unbalanced herringbone or spiral form, configured so as to heighten pressure heading toward the base of said conical cavity; wherein said conic frustum portion diametrically expands heading toward the base of said conical cavity, and said conic frustum portion is configured such that said frustum height is less than one-half the radius of said annular rotor magnet.

12. A spindle motor comprising:

a shaft fixedly fitted into a bracket;

a conic frustum portion being a part of said shaft, and whose diameter changes evenly along said shaft longitudinally;

an approximately disk-shaped hub disposed concentrically about said conic frustum portion, said hub radially outwardly having a disk-mounting portion on one side thereof and centrally having a flat-based conical cavity whose opening changes in diameter evenly along said shaft longitudinally, to correspond in contour to and accommodate in its entirety said conic frustum portion at an approximately uniform gap between said conical cavity along its inner peripheral surface opposing said conic frustum portion along its lateral surface;

an annular rotor magnet mounted on the other side of said hub;

a stator installed opposing a radial edge face of said rotor magnet;

oil filling a clearance, including the approximately uniform gap, between said conic frustum portion and said conical cavity, wherein said oil is retained continuously without interruption; and one and only one dynamic-pressure bearing formed in said gap, between the lateral surface of said conic frustum portion and the inner peripheral surface of said conical cavity opposing the lateral surface, said dynamic-pressure bearing including, on at least either said lateral surface of said conic frustum portion or said inner peripheral surface of said conical cavity, grooves in unbalanced herringbone or spiral form, configured so as to heighten pressure heading toward the base of said conical cavity; wherein said conic frustum portion either diametrically expands or diametrically contracts heading toward the base of said conical cavity, and said conic frustum portion is configured such that said frustum height is less than one-half the radius of said annular rotor magnet.

* * * * *